United States Patent
Krishnamoorthy et al.

(10) Patent No.: US 8,405,332 B1
(45) Date of Patent: Mar. 26, 2013

(54) METHOD TO ELIMINATE CURRENT SURGE DURING SPINDLE SPIN UP

(75) Inventors: Ravishanker Krishnamoorthy, Rivervale Crest (SG); Foo Leng Leong, Singapore (SG)

(73) Assignee: Marvell International Ltd., Hamilton (BM)

( * ) Notice: Subject to any disclaimer, the term of this patent is extended or adjusted under 35 U.S.C. 154(b) by 309 days.

(21) Appl. No.: 12/705,444

(22) Filed: Feb. 12, 2010

Related U.S. Application Data (60) Provisional application No. 61/154,862, filed on Feb. 24, 2009.

(51) Int. Cl.
  *H02H 7/09* (2006.01)
(52) U.S. Cl. ......... 318/400.22; 318/400.13; 318/400.16; 318/798; 318/805; 360/73.03; 360/31; 360/51; 360/73.02; 388/801; 363/135; 363/136; 363/137; 363/138; 363/139
(58) Field of Classification Search ............. 318/400.13, 318/400.16, 400.34, 400.35, 400.01, 400.05, 318/400.06, 400.32, 254.1, 400.26, 700, 318/798, 805; 360/73.03, 31, 51, 69, 71, 360/73.01, 73.02; 388/801; 363/135, 136, 363/137, 138, 139
See application file for complete search history.

(56) References Cited

U.S. PATENT DOCUMENTS

| | | | |
|---|---|---|---|
| 5,481,170 A * | 1/1996 | Edelen et al. | 318/650 |
| 5,486,743 A * | 1/1996 | Nagai | 318/400.13 |
| 5,780,986 A * | 7/1998 | Shelton et al. | 318/432 |
| 6,967,458 B1 * | 11/2005 | Bennett et al. | 318/400.04 |
| 6,970,319 B1 * | 11/2005 | Bennett et al. | 360/75 |
| 7,443,119 B2 * | 10/2008 | Liu | 318/400.01 |
| 7,548,392 B1 * | 6/2009 | Desai et al. | 360/75 |
| 2001/0015196 A1 * | 8/2001 | Marumoto et al. | 123/399 |
| 2007/0013339 A1 * | 1/2007 | Ma et al. | 318/810 |

* cited by examiner

*Primary Examiner* — Walter Benson
*Assistant Examiner* — Jorge Carrasquillo (57) ABSTRACT

Systems, methods and computer program products for reducing or removing current spikes generated during a current recirculation period associated with phase switching in a spindle motor are described. In some implementations, the duty cycle of the drive signals applied to the windings of the spindle motor can be adjusted to reduce or eliminate the current surge resulting from current recirculation. In some implementations, the duty cycle of the drive signals during spin-up can be reduced based on a current limit, and the reduced duty cycle can then be used to drive the spindle motor taking into account of current surges in the supply current.

20 Claims, 7 Drawing Sheets

METHOD TO ELIMINATE CURRENT SURGE DURING SPINDLE SPIN UP

CROSS-REFERENCE TO RELATED APPLICATIONS

This application claims the benefit of priority to U.S. Provisional Application Ser. No. 61/154,862, titled "METHOD TO ELIMINATE CURRENT SURGE DURING SPINDLE SPIN UP," filed on Feb. 24, 2009.

TECHNICAL FIELD

The subject matter of this application is generally related to control of rotating media recording devices, such as hard disk drives.

BACKGROUND

Hard disk drives are commonly used as storage devices for storing and retrieving digital information. For example, some of the consumer products available in the current electronics market (e.g., portable music players and cellular phones) include internal hard disk drives each with a particular storage capacity designed to accommodate user data and functions. The digital information is usually read from or recorded onto a circular disk of a hard disk drive while rotating the disk about a spindle by a spindle motor. As the disk is spun at a particular rate, the servo mechanism of the hard disk drive moves across the disk surface and is positioned over a specific track to read out information recorded on the disk.

When power is initially applied to an electronic device supplied with a hard disk drive, the hard disk drive undergoes a "spin-up" process to bring the disk up to operating speed and to initialize a startup procedure. To conserve energy and improve power efficiency, the hard drive disk normally shuts down after detecting a period of non-use. At the next disk access, the spindle motor of the hard disk drive then spins up again and re-initializes the startup procedure.

Thus, the access time for retrieving and recording data from the hard disk drive can depend on how quickly the spin-up process can be completed by driving the spindle motor to a steady-state operating speed.

SUMMARY

Systems, methods and computer program products for reducing or removing current spikes generated during a current recirculation period associated with phase switching in a spindle motor are described. In some implementations, the duty cycle of the drive signals applied to the windings of the spindle motor can be adjusted to reduce or eliminate the current surge resulting from current recirculation. In some implementations, the duty cycle of the drive signals during spin-up can be reduced based on a current limit, and the reduced duty cycle can then be used to drive the spindle motor taking into account of current surges in the supply current.

In some implementations, a method can be used that includes identifying a present duty cycle associated with a phase winding of a motor, identifying a current limit associated with the motor, determining a new duty cycle based on the current limit, and adjusting the present duty cycle of the phase winding using the new duty cycle.

In some implementations, a maximum duty cycle that achieves a maximum motor speed of the motor can be determined, and the motor can be driven based on the maximum duty cycle.

In some implementations, the new duty cycle can be one that achieves the maximum motor speed and compensates for current surge triggered during phase switching of the phase winding.

In some implementations, the present duty cycle can be adjusted during phase switching of the phase winding. In some implementations, a new duty cycle that is smaller than the present duty cycle can be identified. In some implementations, the present duty cycle can be reduced based on the new duty cycle.

In some implementations, an output of a digital-to-analog converter configured to generate a current flowing through the motor to control the maximum motor speed of the motor can be adjusted.

In some implementations, a device can be used that includes a motor, and a motor control module configured to control a motor speed of the motor, the motor control module including a control module to identify a present duty cycle associated with a phase winding of the motor, identify a current limit associated with the motor, determine a new duty cycle based on the current limit, and adjust the present duty cycle of the phase winding using the new duty cycle.

In some implementations, the new duty cycle can yield the maximum motor speed and compensate for current surge triggered during phase switching of the phase winding. In some implementations, the present duty cycle can be adjusted during phase switching of the phase winding. In some implementations, the new duty cycle can be smaller than the present duty cycle. In some implementations, the present duty cycle can be adjusted by reducing the present duty cycle based on the new duty cycle.

In some implementations, the present duty cycle can be adjusted by adjusting an output of a digital-to-analog converter configured to generate a current flowing through the motor to control the maximum motor speed of the motor.

In some implementations, the motor control module can be configured to determine a current recirculation period at which drive voltages among respective windings of the motor are commutated, where the new duty cycle can be adjusted during the current recirculation period.

In some implementations, a system can be used that includes a motor having a plurality of phase windings and operating at a first duty cycle, a digital-to-analog converter to control the first duty cycle for controlling a motor speed of the motor, and a controller to determine a current limit associated with limiting a current flowing through the plurality of phase windings, identify a second duty cycle based on the current limit, and control the digital-to-analog converter to adjust the first duty cycle of the motor based on the second duty cycle.

In some implementations, the digital-to-analog converter can control the motor speed of the motor by reducing the first duty cycle to the second duty cycle.

In some implementations, the controller can control commutation associated with the plurality of phase windings to generate a predetermined commutation angle at one or more transitional periods, and adjust the first duty cycle before the one or more transitional periods.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Generally, an increase in duty cycle allows more supply current to be drawn to the spindle motor. Specifically, during an initial spin-up process, peak current is drawn from the supply voltage to support a particular acceleration profile of the spindle motor without exceeding an established current limit. To fully utilize the supply current flowing through the spindle motor, a full (or close to full) duty cycle can be used to ensure that the acceleration of the spindle motor is at its maximum. To accelerate the spindle motor, the spindle motor can be driven by sequencing a series of commutation phases so as to generate the maximum torque that yields the maximum acceleration.

However, during a commutation phase transition, current in a particular phase winding of the spindle motor can be dumped back into the supply voltage, which can give rise to current spikes (e.g., current spikes in non-tristated phases). For example, as one phase is driven high and goes tristated, current in that phase can spike sharply, which can give rise to current surge.

Also, during the transition, current limit protection is disabled to allow the spindle motor to accelerate without interruption. However, disabling current limit protection also allows current to surge past the previously set current limit. Although the duration of this transition is short, existing circuit components inside a disc drive system should be properly controlled in order to accommodate such a current surge, which can increase the overall complexity of and cost associated with manufacturing the disc drive system.

In some implementations, the current surge can be reduced or removed by determining a new duty cycle based on the current limit. For example, the duty cycle of the drive signals for driving the spindle motor can be reduced (e.g., while maintaining the overall spin-up profile) based on the current limit, and the reduced duty cycle can then be used to drive the spindle motor taking into account any current spikes in the supply current. By reducing the duty cycle of the drive signals during the transition period, current spikes in the supply current can be reduced or eliminated, which also can result in a lower acoustic noise generated during spin-up, as will be discussed in greater detail below.

Disc Drive System Overview

Figure 1:
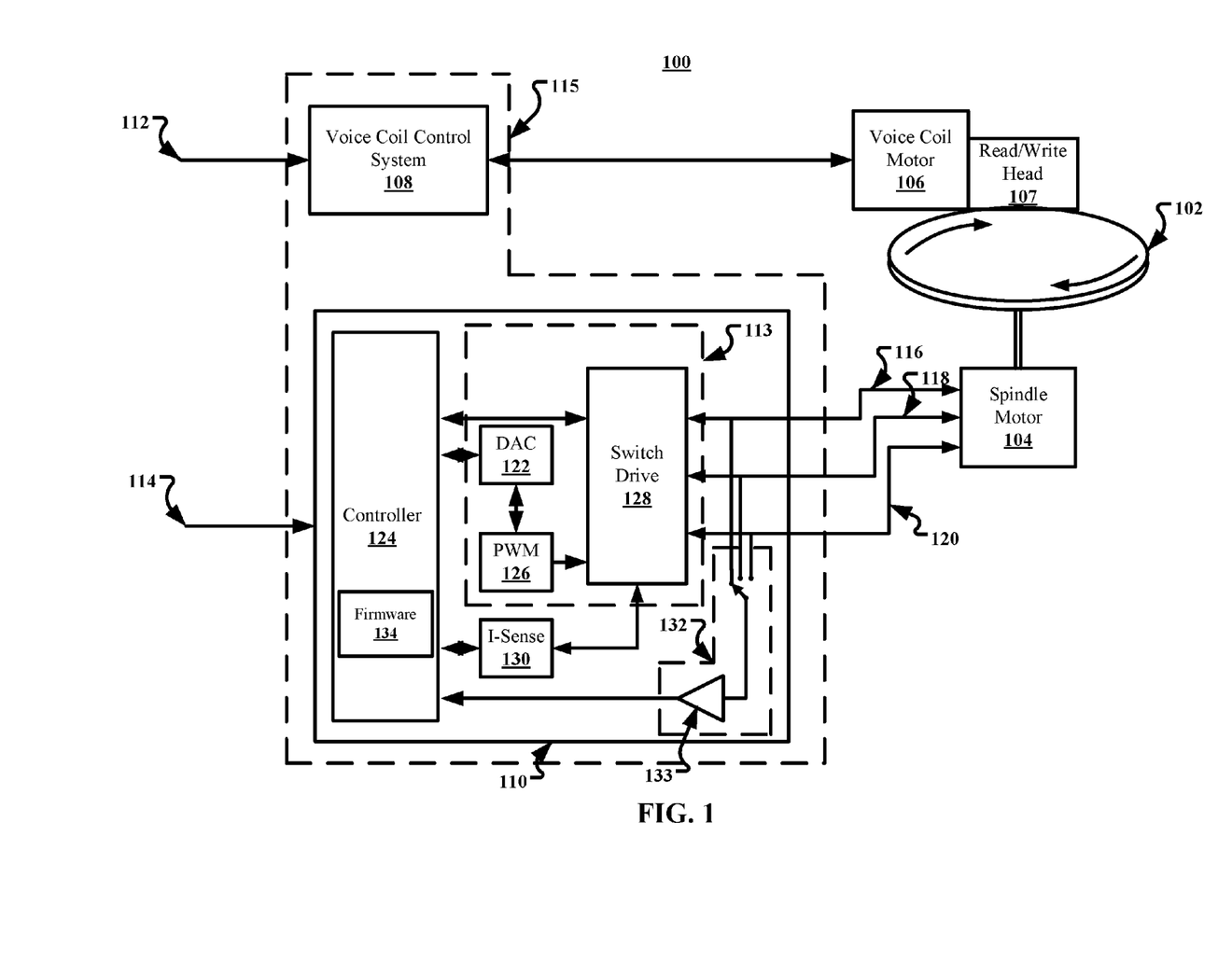
FIG. 1 is a schematic block diagram showing an example of a disc drive system.

FIG. 1 is a schematic block diagram of an example of a disc drive system 100. The disc drive system 100 can include a rotatable storage medium 102 that can be rotated by a spindle motor 104 (which can be driven by a spindle motor driver). A read/write head 107 can be suspended close to the storage medium 102, and a voice coil motor 106 can be used to control the motion of the read/write head 107. The read/write head 107 can move radially to read data from or write data to different tracks on the storage medium 102. Movement information associated with the read/write head 107 can be fed to a voice coil control system 108 (via the voice coil motor 106), which also can control the manner in which the read/write head 107 writes and reads information to and from the storage medium 102. The voice coil control system 108 can control the motion of the read/write head 107 responsive to input commands 112 (e.g., read commands and write commands) received from a CPU-based system, embedded controller, microcontroller, or the like.

Rotation of the storage medium 102 can be dependent on the rotation of the spindle motor 104. The spindle motor 104 can be controlled by a spindle motor control system 110. The spindle motor control system 110 can be configured to respond to input commands 114 (or input commands 112) received from a CPU-based system, embedded controller, microcontroller, or the like. The voice coil control system 108 and the spindle motor control system 110 can be implemented in a monolithic format as a single hard disk drive controller module 115. Alternatively, the voice coil control system 108 and the spindle motor control system 110 can be implemented as discrete modules and/or with discrete system components.

In the disc drive system 100, the spindle motor control system 110 can operate to control the rotation of the spindle motor 104 in response to inductive sensing of the spindle motor rotation. Although this functionality can be accomplished in a number of different manners, the spindle motor control system 110 can include a motor drive system 113 that can be configured to provide pulse width modulated signals 116, 118, and 120 to drive the spindle motor 104. The spindle motor 104 can be in the form of a three-phase Y-connected stator winding with a six pole pair permanent magnet (as will be discussed in greater detail below with respect to FIG. 2). In such a configuration, each minimum possible step angle can be $360°/(6\times6)=10°$, which can correspond to the minimum movement that the spindle motor 104 can advance by applying voltages to its three phases. This configuration also can employ six voltage combinations (or states) to drive the spindle motor 104. In this combination, six electrical states each corresponding to one electrical cycle can be used to drive the spindle motor 104 through a mechanical rotation of 60°. Depending on the configuration of the spindle motor 104, a larger or fewer number of electrical cycles can also be employed.

The spindle motor control system 110 can include a digital-to-analog converter (DAC) 122 that receives data from a controller 124 to provide one or both of a carrier signal and/or modulator signal to a pulse width modulator (PWM) 126. The switched pulse width modulated signals can be provided from the PWM 126 to the input of a switch drive circuit 128. The switch drive circuit 128, in turn, can generate switched pulse width modulated signals 116, 118, and 120 to control the spindle motor 104. A current sense circuit 130 can be included to monitor the drive current flowing to the spindle motor 104. Specifically, the current sense circuit 130 can selectively detect the drive current provided by the switch drive circuit 128 (via switched pulse width modulated signals 116, 118, and 120) during the various electrical cycles such that the drive current can be measured independently during each electrical cycle. Based on the detection, the current sense circuit 130 can provide one or more signals indicative of the value of the drive current to the controller 124. The signals generated by the current sense circuit 130 can be in the form of analog, digital or the like.

At high rates of rotation, the speed of the spindle motor 104 can be determined by sensing the back-electromotive-force (BEMF) signals from the spindle motor 104. A BEMF sensing circuit 132 can be provided to selectively sense the BEMF signals associated with the switched pulse width modulated signals 116, 118, and 120, and can provide one or more signals to the controller 124 that can be indicative of the value of a selected BEMF signal. The BEMF sensing circuit 132 can include a comparator 133 for comparing the sensed BEMF signals to a predetermined reference, and correspondingly outputting one or more signals to the controller 124. The predetermined reference need not be a fixed value, and can directly correlate with the center tap of the three-phase Y-connected stator winding. The signals generated by the comparator 133 can be in the form of analog signals, digital signals or the like. The controller 124 can use the signals generated by the comparator 133 to control the speed of the spindle motor 104 to ensure that reading and writing operations are performed properly.

The controller 124 can be implemented in hardware, or a combination of hardware and code, to control the operation of the motor drive system 113 and the spindle motor control system 110. For example, the controller 124 can include firmware 134 that can be executed by the controller 124 to direct and manage the general operation of the motor drive system 113. As another example, the firmware 134 can be executed by the controller 124 to implement a number of different functions that can be executed by the spindle motor control system 110 to properly drive the spindle motor 104.

The controller 124 can include internal and/or external memory for storing programming codes associated with controlling the spindle motor 104. For example, the controller 124 can include programming instructions for maintaining accurate spindle speed control based on the velocity feedback signals monitored by the BEMF sensing circuit 132, the DAC 122, the current sense circuit 130 and/or combinations thereof. In response to the velocity feedback signals, the controller 124 can generate or adjust an output current to correct for variations from the desired speed, and control the speed of the spindle motor 104 using the adjusted output current. If the available current is insufficient to maintain accurate control, the controller 124 can increase the commutation phase in advance to achieve the required current. For example, the controller 124 can control the commutation phase advance of the windings of the spindle motor 104 to generate substantially maximum torque if maximum torque is needed. Alternatively, if maximum torque is not needed, the controller 124 can adjust the commutation phase advance to achieve optimal efficiency. This permits an optimal drive current to be delivered to the motor windings when increased torque output is desired, and otherwise to deliver the drive current needed for maximum efficiency.

Spindle Motor

The spindle motor 104 can include stationary elements (or a stator) and rotatable elements (or a rotor). The rotor can include a hub that supports the storage medium 102. The spindle motor 104 can include a bearing arrangement such as sets of ball bearings so that the rotor can rotate about the stator. The stator can include electromechanical stator components including a stator core having core members that radiate away from the center of the core (or center tap) to define stator poles of the stator, and a set of stator wires (or windings) that are wound around the stator poles and interconnected in a predetermined configuration (e.g., a "Y" configuration). The rotor can include a set of permanent magnets that are arranged to define rotor poles of the rotor.

Figure 2:
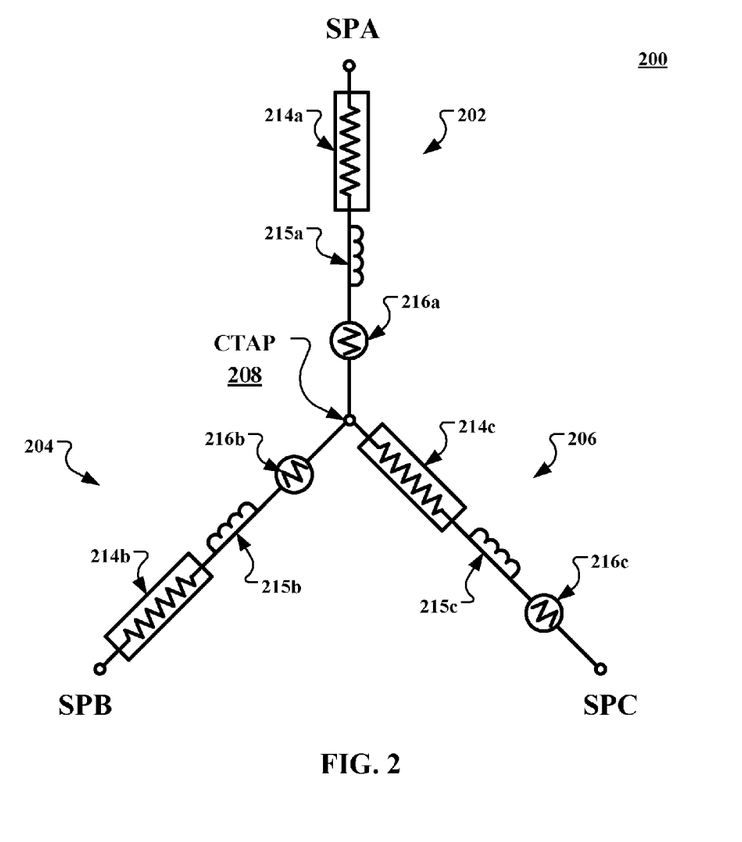
FIG. 2 shows an example of a schematic of a three-phase spindle motor.

In some implementations, the spindle motor 104 can be constructed as a multi-phase motor. For example, the spindle motor 104 can be constructed as a brushless three-phase inductive motor. The three-phase motor can be constructed with a rotating magnet assembly (or spindle) and a stationary coil assembly (or stator). An alternating current can be supplied to the coils of the stator, and the spindle can be rotated by a force created by the alternating current. FIG. 2 shows an example of a schematic of a three-phase spindle motor 200. While a three-phase motor is described, motors with a greater or lesser number of phases than those shown also are contemplated, and any suitable number of windings can be employed to implement any suitable multi-phase spindle motor.

Referring to FIG. 2, the three-phase spindle motor 200 can include three distinct phases; namely, phase A, phase B and phase C. As shown, each phase can be constructed using a respective winding 202, 204 and 206. For example, phase A can be constructed using winding 202, phase B can be constructed using winding 204 and phase C can be constructed using winding 206. Each winding can include one or more discrete passive (or active) elements. For example, phase A can be modeled using winding 202 that includes a resistor 214a (e.g., with resistance R), an inductor 215a and a BEMF voltage 216a ($V_{BEMF}$). The resistor 214a, inductor 215a and the BEMF voltage 216a can be coupled in series between a power supply SPA and a center tap 208. Similarly, phase B can be modeled using winding 204 that includes a resistor 214b, an inductor 215b and a BEMF voltage 216b coupled in series between a power supply SPB and the center tap 208, and phase C can be modeled using winding 206 that includes a resistor 214c, an inductor 215c and a BEMF voltage 216c coupled in series between a power supply SPC and the center tap 208. In some implementations, the center tap 208 can be connected to a supply voltage (not shown).

Although the order of the resistor 214c, the inductor 215c and the BEMF voltage 216c in winding 206 is reversed with respect to those shown in windings 202 and 204, the resulting phase achieved in phase C would be the same if the order of these components is identical. Further, the three-phase spindle motor 200 can include other electrical components, such as, without limitation, switches, capacitors, and transistors.

To adequately control the spindle motor 200 and minimize torque ripple, the current flowing through each phase winding can be measured. The current measured in each phase can then be provided to the controller 124 to generate the pulse width modulated signals 116-120 for adjusting the motor speed. For example, the voltage drop across each resistor 214a-214c, which is connected in series, can be measured to determine the current flowing in each phase winding.

The controller 124 can communicate with and receive commands from a host computer through the input commands 114. In response to the input commands 114, the controller 124 can instruct the DAC 122 and the PWM 126 to generate pulse width modulated signals 116-120 to control the spindle motor 200. The pulse width modulated signals can include control information (e.g., a starting state and a commutation clock), and can be used to modulate the driving current in the phase windings of the spindle motor 200. The spindle motor 200 can be connected to the BEMF sensing circuit 132 to detect threshold crossings (e.g., zero crossings) in the BEMF voltage generated by the windings with respect to the center tap 208. At each BEMF threshold crossing, the BEMF sensing circuit 132 can toggle a signal to generate, for example, a square wave signal. The frequency of the BEMF threshold crossings and thus the frequency of the square wave signal can then be used to indicate the speed of the spindle motor 200. The controller 124 can evaluate the square wave signal and adjust the pulse width modulated signals 116-120 in order to control the speed of the spindle motor 200. In some implementations, the spindle driver that drives the spindle motor (not shown) can include suitable circuitry for generating pulse width modulated signals internally in response to a speed error signal generated by the controller 124. The spindle driver can sense the current flowing through the phase windings of the spindle motor 200 and use current feedback to generate the pulse width modulated signals 116-120.

In some implementations, a current can be supplied to two of the three windings (e.g., windings 202 and 204) of the three-phase motor by applying a voltage between the terminals associated with the two windings and the center tap 208. The third terminal (e.g., winding 206) can be left floating (or tristated) such that the voltage seen on the third terminal is the voltage (e.g., a sinusoidal voltage) induced by the movement of the rotating magnets relative to the windings. Of course, other modes are possible. For example, current can flow through only a single winding between one of the winding terminals and the center tap 208, while no current flows through either of the other two windings. As another example, current can flow through all three of the windings. Generally, a spin-up process can be performed by applying, for example, a DC voltage across a selected combination of the windings to generate a positive torque on the rotor to accelerate the spindle motor 200 to an operating spin-rate.

Given the three terminals and two polarities of current direction for each winding terminal, a current can be supplied to the windings in six different commutations or states. The spindle motor 200 can be driven by sequencing repeatedly through these six states. For example, the spindle motor 200 can cycle from one commutation (e.g., where winding 202 is driven by a high voltage and winding 206 is tristated) to another commutation (e.g., where winding 202 is now tristated while winding 206 is now driven by a high voltage).

In some implementations, each power supply SPA, SPB and SPC can provide a power supply voltage to a respective winding 202-206 to induce BEMF on the respective winding. The level of the motor supply voltage can be controlled based on the pulse width modulated signals 116-120.

In some implementations, BEMF signals (e.g., zero crossings detected by the BEMF sensing circuit 132) can be used for controlling the acceleration of the spindle motor 200 up to a desired operating spin rate. Specifically, by detecting the BEMF signals including the voltage across the spindle motor 200 (e.g., voltage output from the spindle motor 200 and each of the windings 202-206), the motor speed of the spindle motor 200 can be accurately identified. The detected motor speed can subsequently be used to determine whether a steady-state operational speed has been reached and whether the motor spin-up process is complete. For example, the BEMF signals of the spindle motor 200 can be monitored and processed by the controller 124 to generate velocity feedback information (e.g., digital signals indicative of motor speed). Using the velocity feedback information, a corresponding motor speed can be identified. If the identified speed does not meet a predetermined threshold, a motor voltage signal can be generated for controlling the voltage of the spindle motor 200, which modifies the speed and spin-up time of the spindle motor 200.

Spin-Up Process Overview

Generally, fast spin-up rate (e.g., fast motor speed) can shorten the spin-up time required to bring the hard drive disk up to an operating speed before data can be accessed. Similarly, data transfer rates associated with read and write operations can be increased by increasing the spin-up rate of spindle motor 104. The faster the spindle motor 104 can be spun, the sooner data can be written to or read from the storage medium 102. Typically, fast spin-up rates can be realized by utilizing bigger, faster spindle motors having larger windings and higher currents flowing through the windings 202-206.

Increasing the size and speed of the spindle motor 104 places a greater demand on the disc drive system 100 to control and maintain the speed of the spindle motor 104. The disc drive system 100 can utilize current control to maintain the spin rate of the spindle motor 104 at a substantially constant level by controlling the amount of current flowing through the spindle motor 104 and associated windings. The disc drive system 100 can provide a constant current to the spindle motor 104 irrespective of the input power supply voltage and the BEMF induced by the spindle motor 104.

The spindle motor 104 can operate in two different modes; namely, a current control mode, and a voltage control mode. In current control mode, as the speed of the spindle motor 104 increases, the current need not change and can be kept constant. Maintaining a constant current flowing through the spindle motor 104 can be realized by implementing the current control with current feedback. For example, the current feedback can include applying a voltage across the spindle motor 104, sensing the current through the spindle motor 104, generating feedback information indicative of a difference between the sensed current level and a desired current level, and adjusting the voltage across the spindle motor 104 based on the difference so that the current flowing through the spindle motor 104 remains constant at the desired current level throughout the spin-up process.

As the disc drive system 100 ramps up the motor speed, the motor speed induces an increase in BEMF and an increase in the voltage across the spindle motor 104. By monitoring the voltage across the spindle motor 104 and adjusting the current flowing through the spindle motor 104 as necessary, the spin rate can be maximized and spin-up time can be reduced without exceeding the current limit allowed by the disc drive system 100 in the current control mode. With current control, the disc drive system 100 also has greater control (e.g., due to continuous current feedback and adjustment to ensure constant speed) over writing data in a precise track and greater ability to avoid writing data over forbidden track areas, which can cause permanent damage to the platters and the disks.

In voltage control mode, the voltage across the spindle motor 104 can be kept constant. As the speed of the spindle motor 104 increases, the current through the spindle motor 104 decreases due to the applied force generated by the BEMF induced by the current. That is, on start-up, even when the mechanical power required is small, the current drawn from the power supply can still be very large. In voltage control mode, the current flowing through the spindle motor 104 can depend on the speed and the BEMF. Unlike current control, which uses current feedback and voltage adjustment for controlling the motor speed, voltage control need not use any feedback mechanism since voltage control can be implemented in an open loop setting.

In voltage control mode, the BEMF voltage can be used to provide an indication of the target speed of the spindle motor 104 (e.g., whether the spindle motor 104 is operating above or below a maximum or minimum speed). Other measurement techniques also are possible. For example, if the motor speed is below a given minimum speed, the BEMF signals can have a signal-to-noise ratio that is too weak to be detected. By ramping up the speed of the spindle motor 104 until a point at which the BEMF signals can be detected, the motor speed can readily be inferred. As another example, if the motor speed is beyond a given maximum threshold, the BEMF signals can indicate a signal-to-noise ratio that exceeds a predetermined ratio. In this event, the speed of the spindle motor 104 can be ramped down until the signal-to-noise ratio meets the predetermined limit.

The spindle motor 104 also can operate in a voltage control mode that utilizes a pseudo-current mechanism to achieve a shortest spin-up time for a given current (e.g., less than a maximum allowable current). Specifically, a voltage mode with current limit can be implemented, which limits the current flowing through the spindle motor 104 while incrementally increasing the voltage across the spindle motor 104. By continuously increasing the voltage across the spindle motor 104 in small steps at specified time intervals while preventing the current from reaching beyond the current limit, this technique can yield short spin-up time and circuit simplicity without encountering stability and oscillation issues associated with current control.

During a spin-up process, it may be desirable to accelerate the spindle motor 104 as fast as possible without exceeding the current limit imposed on the supply voltage. As discussed above, at the beginning of the spin-up process, the spindle motor 104 can be spun using one of six-state commutations with a motor speed that is relatively low, which means that the BEMF voltage in the windings of the spindle motor also is low but the peak current is high (e.g., where the current is operating at a current limit). The current through the spindle motor, together with the voltage across the spindle motor 104, can be used to define the maximum power that can be delivered to the spindle motor 104.

To spin up the spindle motor 104 as quickly as possible, the start current can be set as high as the hard drive power supply can deliver. As the spindle motor 104 begins to accelerate, the BEMF voltage in the windings of the spindle motor 104 also increases to thereby lower the peak current drawn by the windings of the spindle motor 104 (e.g., from a particular current level to the current limit). That is, the spindle motor 104 operates at optimal efficiency until the spindle motor 104 reaches a speed at which the available current (i.e., actual current) drops below the commanded current.

Current Surge

As discussed above, the spindle motor 104 can commutate between multiple states by selectively switching the particular phase winding(s) to which current is sourced and from which current is sunk as the spindle motor 104 rotates through the commutation states (e.g., each of six commutation states for a three-phase spindle motor). For example, the windings 202-206 can be sequentially energized to produce a rotating current path through two of the windings, leaving the third winding in tristate mode.

Generally, peak current limiting during spin-up operates by allowing the current flowing through the spindle motor 104 to ramp up to the current limit as one winding is tied to an operating high voltage while another winding is tied to an operating low voltage. When the current flowing through the spindle motor 104 has reached the peak current, the supply voltage can be shut off to allow the motor current to decay from the peak current value. Due to the inductance in the windings (e.g., inductance of inductors 215a-215c), the motor current does not drop to zero instantaneously. Instead, the current gradually dissipates and decays. Typically, the off-time during which both windings are tied to the same voltage is not long enough for the motor current to decay completely to zero. When both windings are switched back to the operating state (e.g., where one winding is at a high voltage and the other is at a low voltage), the motor current ramps up again from that point (e.g., instead of zero) until the peak current is reached. Each time that the peak current is reached, both windings are tied to the same voltage that allows the motor current to decay.

During the spin-up phase, the current flowing through the spindle motor 104 from the high operating voltage to the low operating voltage is seen across the sense resistor as a series of short pulses. The current is drawn from the power supply when both active terminals are tied to different voltages. When both terminals are tied to different voltages, the current flows from the power supply into the high voltage terminal and out through the low voltage terminal of the spindle motor 104. When both terminals are tied to the same operating voltage, the current flows from the power supply into the high voltage terminal and back to the power supply such that no current is drawn from the power supply.

At the end of each commutation (e.g., every sixty degrees of rotation), the phase is switched to allow BEMF crossings to be detected and so that a different pair of windings can be used for the next commutation state. Typically, current limit protection is switched off at each commutation transition (or phase switching) to allow the spindle motor 104 to continue to accelerate. However, because the current limit is switched off during phase switching, the current flowing through the inductor of a winding (e.g., the winding that is transitioning into a tristate mode) should change its current path (e.g., to a different phase winding that is to be driven high or low). Because the current cannot change the current path instantaneously, the residual current recirculates back to the source terminal (e.g., by dumping the current in the inductors back to the power supply), causing an undesirable current surge at the supply. Specifically, phase switching can cause the current in one of the phases to reverse back to the supply voltage (e.g., current flowing through the inductor 215a of winding 202 to flow back to the supply voltage phase SPA).

Also, during this current recirculation period, the controller 124 and associated current limit circuits can sense only a portion of the current flowing through the spindle motor 104. Because only a portion of the current is detected, the current passing through the spindle motor 104 can actually be higher than the established current limit. Specifically, when one phase of the motor power supply is tristated during the current recirculation period, corresponding current spikes occur in the phases that have not been tristated.

Further, with current limit protection disabled during the current recirculation period, a large duty cycle allows the current to surge past the previously set current limit. Even if the current limit is active, the current recirculation can cause the supply current to surge, particularly when the driving voltage (e.g., encoded by a DAC control signal generated by the DAC 122) is not properly set. Although the duration of the current recirculation is short, existing circuit components inside the disc drive system 100 should be properly controlled in order to accommodate such a current surge, which can increase the overall complexity of and cost associated with manufacturing the disc drive system 100.

Figure 3A:
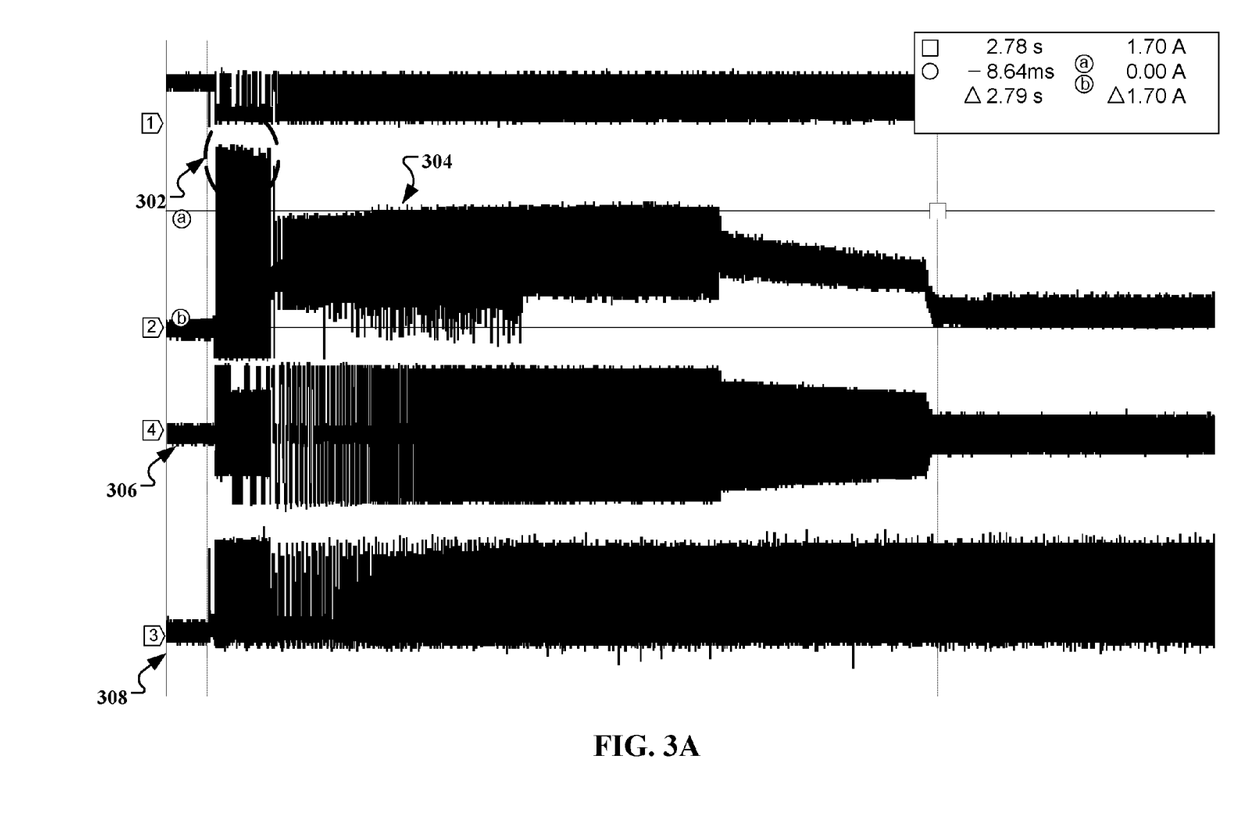
FIG. 3A shows an example of a graph illustrating a current surge triggered by current recirculation.

FIG. 3A shows an example of a graph illustrating a current surge triggered by the current recirculation. As shown in FIG. 3A, current recirculation can arise during phase switching, and can give rise to current surge 302, particularly when the current limit is inactive during the current recirculation period. In some instances, the current surge 302 can be 25%-50% higher than the operating current 304. The current surge 302 can lead to undesirable speed jitter and acoustic noise (e.g., as measured by the skew rate), and can increase the peak supply current by going beyond that which is imposed by the current limit. The current surge 302 also can lead to a longer recirculation period, which can prolong the spin-up time required to bring the spindle motor 104 up to an operating speed. The phase current 306 and corresponding phase voltage 308 also are noisy during the same period at which the current surge 302 occurs.

Figure 3B:
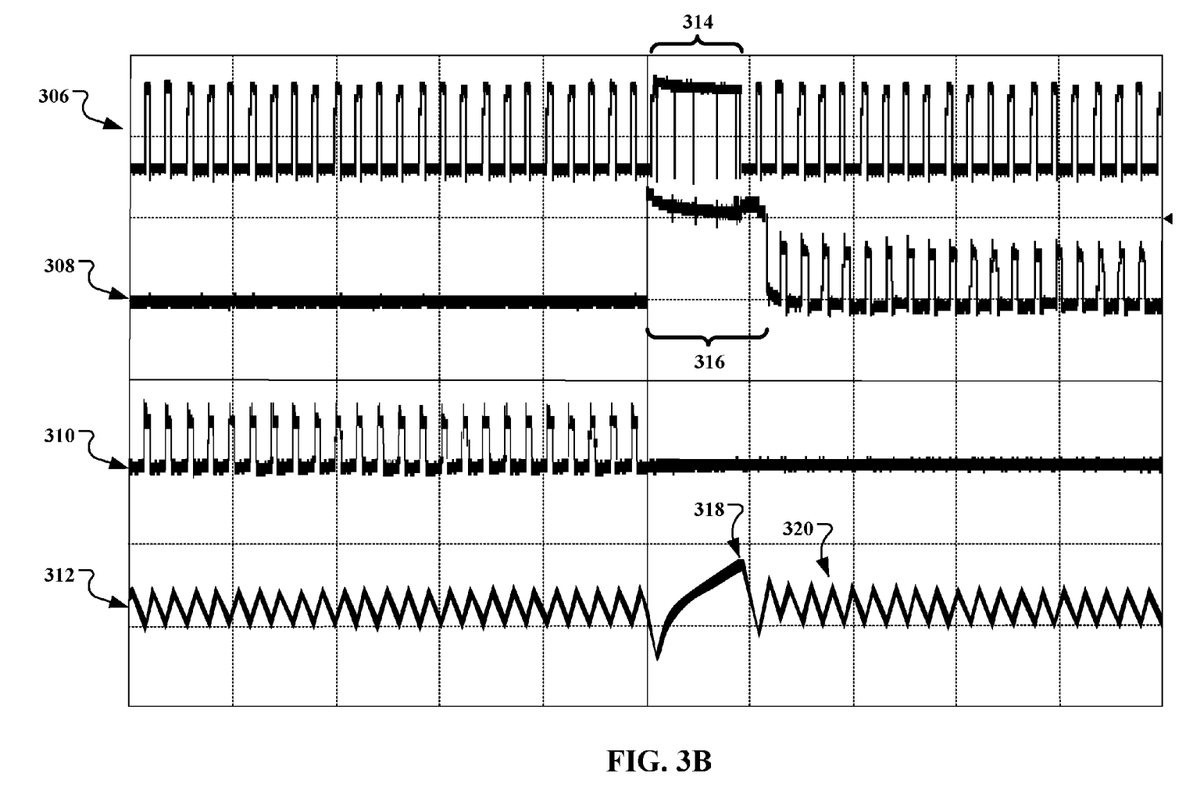
FIG. 3B shows an example of a graph illustrating the performance of each phase of a three-phase spindle motor during a current recirculation period.

FIG. 3B shows an example of a graph illustrating the performance of each phase of a three-phase spindle motor during the current recirculation period. In FIG. 3B, the drive signal for phase A is represented by reference numeral 306, the drive signal for phase B is represented by reference numeral 308, and the drive signal for phase C is represented by reference numeral 310. As shown in FIG. 3B, phase A is initially pulled high and phase B is pulled low, while phase C is in a tristate mode (e.g., between "0" and "1"). When the phases are switched (e.g., from driving phase A and phase B with phase C in tristate to driving phase A to phase C with phase B in tristate), the current limit is OFF (as indicated by reference numeral 314) and the supply current 312 begins to rise during the current recirculation period 316 (e.g., a duration of fifteen microseconds) until a current level 318 above the normal operating supply current 320 is reached. The supply current surge can be attributed to setting the full DAC value during spin-up to reduce the spin-up time associated with maximizing the motor speed (e.g., to command maximum torque) and setting the current limit low (e.g., at 1.2 amps) to accommodate speed acceleration. Since it is desirable to accelerate the spindle motor 104 as fast as possible without exceeding the current limit, conventional spin-up processes set the duty cycle of the drive signals close to the full duty cycle (e.g., from 95% to 100%). The duty cycle of the drive signals (e.g., pulse width modulated signals) can be used to accelerate the spindle motor 104 and determine the percentage of time that the drive voltage is applied to spindle motor 104 for acceleration.

In some implementations, the duty cycle of the drive signals applied to the windings (e.g., windings 202-206) can be adjusted to reduce or eliminate the current surge resulting from current recirculation. For example, the duty cycle of the drive signals during spin-up can be reduced based on the current limit, and the reduced duty cycle can then be used to drive the spindle motor 104 taking into account of current surges in the supply current. By reducing the duty cycle of the drive signals during the current recirculation period, current spikes in the supply current can be reduced or eliminated, which also can result in a lower acoustic noise generated during spin-up. It should be noted that any of the three phases can be the phase that is tristated during the current recirculation period, just as any of the phases can be the phase that is pulled high or pulled low during the same period, and the state at which each phase is operating depends on the presently operating cycle. In some implementations, the duty cycle can be adjusted before the recirculation period. For example, once the power on reset is lifted, the controller 124 can determine the value of the duty cycle to be used for driving the non-tristated windings.

In some implementations, the duty cycle of the drive signals can be adjusted by adjusting the DAC value. For example, once a desired motor speed has been specified (e.g., through input commands 114 from the host), a value in the spindle DAC can be set. For an n-bit spindle DAC, the maximum value can be, for example, $2^n$, which is the spindle DAC range, where a motor speed setting can be specified as a value within the spindle DAC range. The duty cycle can be the ratio of the actual ON-time with respect to the maximum possible ON-time (e.g., which is equal to the ratio of the spindle DAC value to the spindle DAC range).

In general, the duty cycle of the drive signals can vary from 0% (motor coasts) to 100% (maximum torque). When the speed control loop is closed, various mechanical factors can cause the duty cycle (or voltage) of the drive signals to increase or decrease in order to reach, and hold, a desired speed. During spin-up, the high inertia of the spindle motor 104 requires a high duty cycle (or voltage) for acceleration, whereas a low motor inertia results in a correspondingly lower duty cycle (or voltage). In some implementations, a new duty cycle can be determined based on the current limit associated with driving the spindle motor 104. Specifically, the current limit can be used to determine the length of the duty cycle that permits the supply current to be drawn without exceeding the imposed current limit. By determining a new duty cycle that takes into account of the current spikes, current can be maintained below the current limit while maintaining the acceleration profile of the spindle motor 104. For example, new duty cycles can be determined for achieving different acceleration profiles for the spin-up stage (which may require a duty cycle that provides maximum torque and acceleration) and speed control stage (e.g., which may require a duty cycle that provides stability and constant speed). As discussed above, spindle motors are conventionally driven using high duty cycle to maximize the spin-up rate and reduce the spin-up time. Due to the current limit, such a large duty cycle does not always yield a faster spin-up time or spin-up rate. By adjusting the duty cycles at various spin-up and speed control phases, maximum efficiency can be achieved while minimizing current surges that can give rise to undesirable noise.

Figure 4:
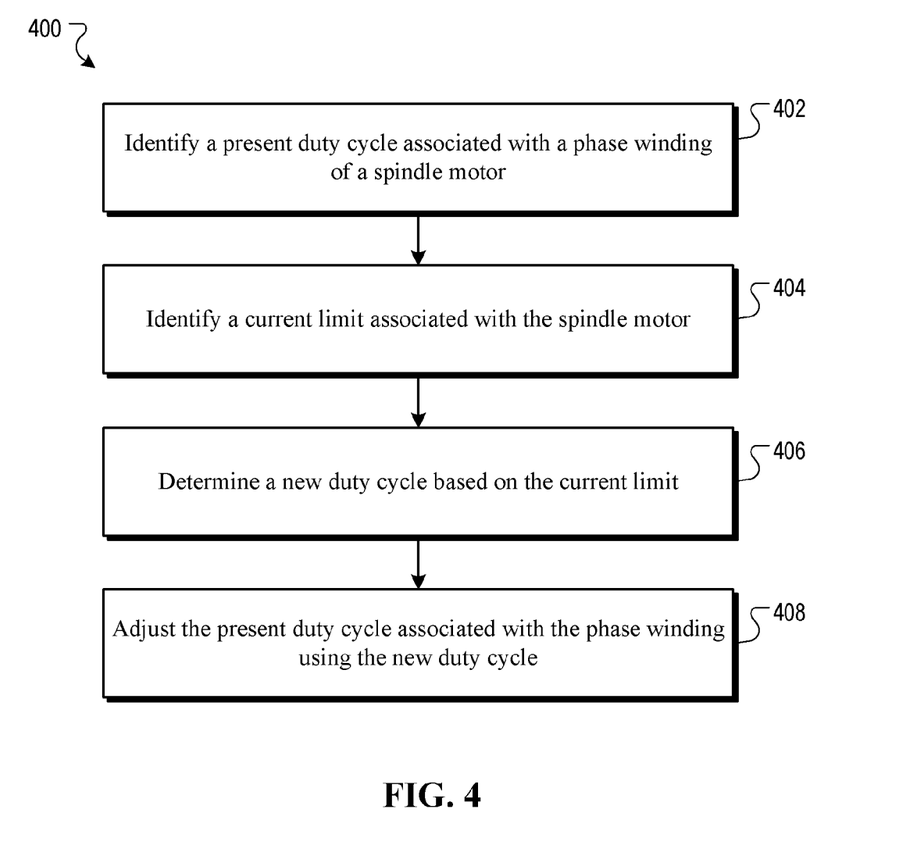
FIG. 4 is a flow diagram showing an example of a process for adjusting a duty cycle associated with a phase winding.

FIG. 4 is a flow diagram showing an example of a process 400 for adjusting the duty cycle associated with a phase winding to reduce or eliminate current surge generated during phase switching. The process 400 can be performed, for example, by the disc drive system 100, and for clarity of presentation, the description that follows uses the disc drive system 100 as the basis of examples for describing the process 400. However, another system, or combination of systems, can be used to perform the process 400.

Referring to FIG. 4, at 402, a present duty cycle associated with a phase winding of a spindle motor can be identified. As discussed above, the supply voltage can be periodically applied to the windings of the spindle motor 104 in a desired commutation sequence resulting in a rotational torque. During each commutation sequence, a selected winding can be driven based on the pulse width modulated signals provided by the controller 124 and the PWM 126. In some implementations, the present duty cycle can be identified based on the pulse width modulated signals (e.g., which controls the duty cycle for applying the power supply voltage to the spindle motor 104). In implementations where the duty cycle is set by the host coupled to the spindle motor control system 110, the duty cycle can be identified based on the received input commands 114. In some implementations, the input commands 114 need not set forth an exact duty cycle value. For example, the input commands 114 can set forth an estimated value to achieve current surge reduction (or elimination) without causing the spindle motor 104 to brake. In yet other implementations, the duty cycle can be identified using the DAC values across the DAC 122 or the spindle DAC range associated with the DAC 122. In some implementations, the controller 124 can determine the present duty cycle during (or prior to) the spin-up stage of the spindle motor 104. As the DAC value changes due to the speed control loop, the new DAC value can be fed back to the controller 124 (e.g., via a serial port) to identify a new duty cycle.

At 404, a current limit associated with the spindle motor can be identified. The current limit can be identified by querying the host or the controller 124. Generally, the current limit is set by the host to prevent, for example, potential current overshoot that could damage the disc drive system 100, or to maintain consistency with a load that the host is designed to accommodate or to maximize the performance of the disc drive system 100. Information associated with the current limit can be received and identified together with the startup instructions from the host. Information associated with the current limit also can be detected by continuously or periodically monitoring various performance and operational drive parameters and empirically determining the current limit.

Information associated with the current limit can vary from applications to applications. For example, in mobile-type applications where mobile devices require fast spin-up time but low current consumption for maximizing battery life, the host can attempt to output a suitable current limit in an effort to strike a balance between the spin-up time and power conservation. As another example, for desktop or enterprise applications where power conservation is not an important issue, the host can set a maximum current limit to allow for optimum spin-up time.

Generally, an increase in duty cycle allows more supply current to be drawn to the spindle motor 104. Specifically, during the initial spin-up process, peak current is drawn from the supply voltage (e.g., when the BEMF voltage 216a-216c associated with the windings is relatively low) to support a particular acceleration profile of the spindle motor 104 without exceeding the current limit. To maximize the current flowing through the spindle motor 104, the controller 124 and the PWM 126 can command a maximum torque using a duty cycle of, for example, 95% or above.

As the spindle motor 104 begins to accelerate, the BEMF voltage in the windings of the spindle motor 104 also increases to thereby lower the peak current drawn by the windings of the spindle motor 104. That is, the spindle motor 104 operates at optimal efficiency until the spindle motor 104 reaches a speed at which the available current (i.e., actual current) drops below the commanded current.

As already discussed, the decrease in the amount of available current is due to the increase in magnitude of the BEMF as speed increases, which in turn diminishes the voltage headroom margin. The voltage headroom indicates the amount of current that can be supplied to the spindle motor 104 for a given supply voltage, and robust speed control generally demands sufficient voltage headroom. When the voltage headroom margin is fully exhausted, a current limiting speed (i.e., speed beyond which the power supply cannot deliver the current commanded by the spindle driver driving the spindle motor 104) has been reached. This is due to the fact that the BEMF increases with motor speed, and limits the available drive current due to the limited voltage headroom. After this point in the acceleration profile, the available current will continue to decay.

At this time, sensing that the current flowing through the spindle motor 104 is below the current limit (as detected by, for example, the current sensing circuit 130), which indicates the availability of extra voltage headroom, the controller 124 can determine an actual difference between the available current and the current limit. Based on the actual difference, the controller 124 can instruct the PWM 126 to increment the voltage across the spindle motor 104 by a predetermined amount corresponding to the actual current difference. This voltage increment provides a boost to current acceleration speed, which shortens the spin-up time to reach the target speed.

However, during phase switching (when one phase is tristated while a first one of the other phases is driven high and the second one of the other phases is driven low), current in an inductor associated with a particular phase winding can be dumped back into the supply voltage, which gives rise to current spikes (e.g., current spikes in non-tristated phases). For example, as one phase is driven high, current in that phase spikes sharply that gives rise to current surge. Also, spindle motors are conventionally driven using high duty cycle to maximize the spin-up rate and reduce the spin-up time. For example, spindle motors are generally driven to 95% or above of the full duty cycle. However, because of the current limit, such a large duty cycle does not always yield a faster spin-up time or spin-up rate.

At 406, a new duty cycle can be determined based on the current limit. In some implementations, depending on the current limit imposed on the spindle motor 104, a corresponding duty cycle can be determined that allows more supply current to be drawn between the rise time and fall time of each duty cycle while giving sufficient current headroom for the current to decay before the more current is drawn again to accelerate the spindle motor 104 at the next duty cycle. For example, if the current limit is set at 1.2 amps, then the duty cycle can be correspondingly set at 30%. As another example, if the current limit is set at 1.5 amps, then the duty cycle can be correspondingly set at 45%. In some implementations, the duty cycle during the current recirculation period can be the same as the duty cycle used in the normal operating cycle (e.g., both at 30%).

In some implementations, one or more DAC settings can be determined before the spin-up process. Each DAC setting can correspond to a specific duty cycle. These DAC settings, in some implementations, can be used for different stages of the spin-up phase until the speed control phase is initialized. Because the torque and duty cycle requirements are different for different stages of the spin-up process, the DAC settings allow the controller 124 to be programmed to suit different motor types and spin-up profiles quickly and conveniently.

At 408, based on the new duty cycle, the present duty cycle can be adjusted. For example, the controller 124 can generate, based on the new duty cycle, a duty cycle command to adjust the existing duty cycle of the pulse width modulated signals to maintain the established acceleration profile of the spindle motor 104 during the current recirculation period while reducing or eliminating any current surge triggered by the current recirculation.

By determining a new duty cycle based on the current limit, the disc drive system 100 ensures that the spindle motor 104 continuously accelerates during the recirculation period to reduce spin-up time and that the supply current drawn during the current recirculation period does not exceed the current limit at any given time interval as a result of the speed increase. By driving the spindle motor 104 at the maximum speed using the new duty cycle (e.g., which can be set before the recirculation period but before power on reset), the overall spin-up time of the spin-up process is significantly shortened. Once the command speed is achieved, the current required to drive the spindle motor 104 is also kept below the current limit, resulting in reduction (or elimination) of current spikes, which can lead to system stability and efficiency. Even further, the new duty cycle allows a smaller supply current to be used that permits thinner printed circuit board trace width and smaller supply capacitor values to be utilized in the disc drive system 100, yielding significant manufacturing cost savings.

In some implementations, operations 402-408 can be performed in the order listed, in parallel (e.g., by the same or a different process, substantially or otherwise non-serially). In other implementations, operations 402-408 can be performed out of the order shown. For example, the present duty cycle can be identified after the current limit has been identified. In some implementations, the order in which operations 402-408 are performed can depend, at least in part, on what entity performs the method. Operations 402-408 also can be performed by the same or different entities or systems.

Figure 5A:
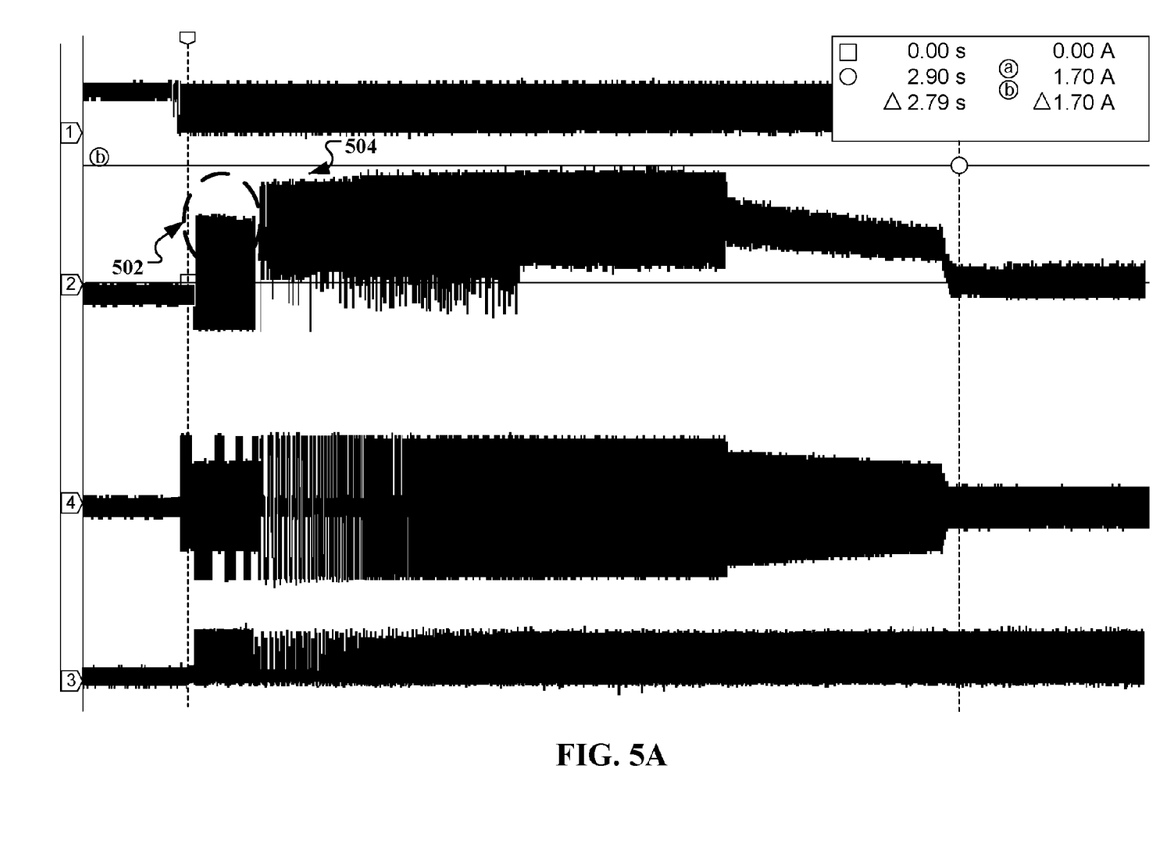
FIG. 5A shows an example of a graph illustrating the removal of the current surge shown in FIG. 3A.

FIG. 5A shows an example of a graph illustrating the removal of the current surge shown in FIG. 3A. As shown in FIG. 5A, driving the spindle motor 104 using the new duty cycle allows the current level 502 to be kept below the normal operating current level 504 and current spikes in the supply current generated during phase switching to be removed entirely, while meeting the normal operating current level 504.

Figure 5B:
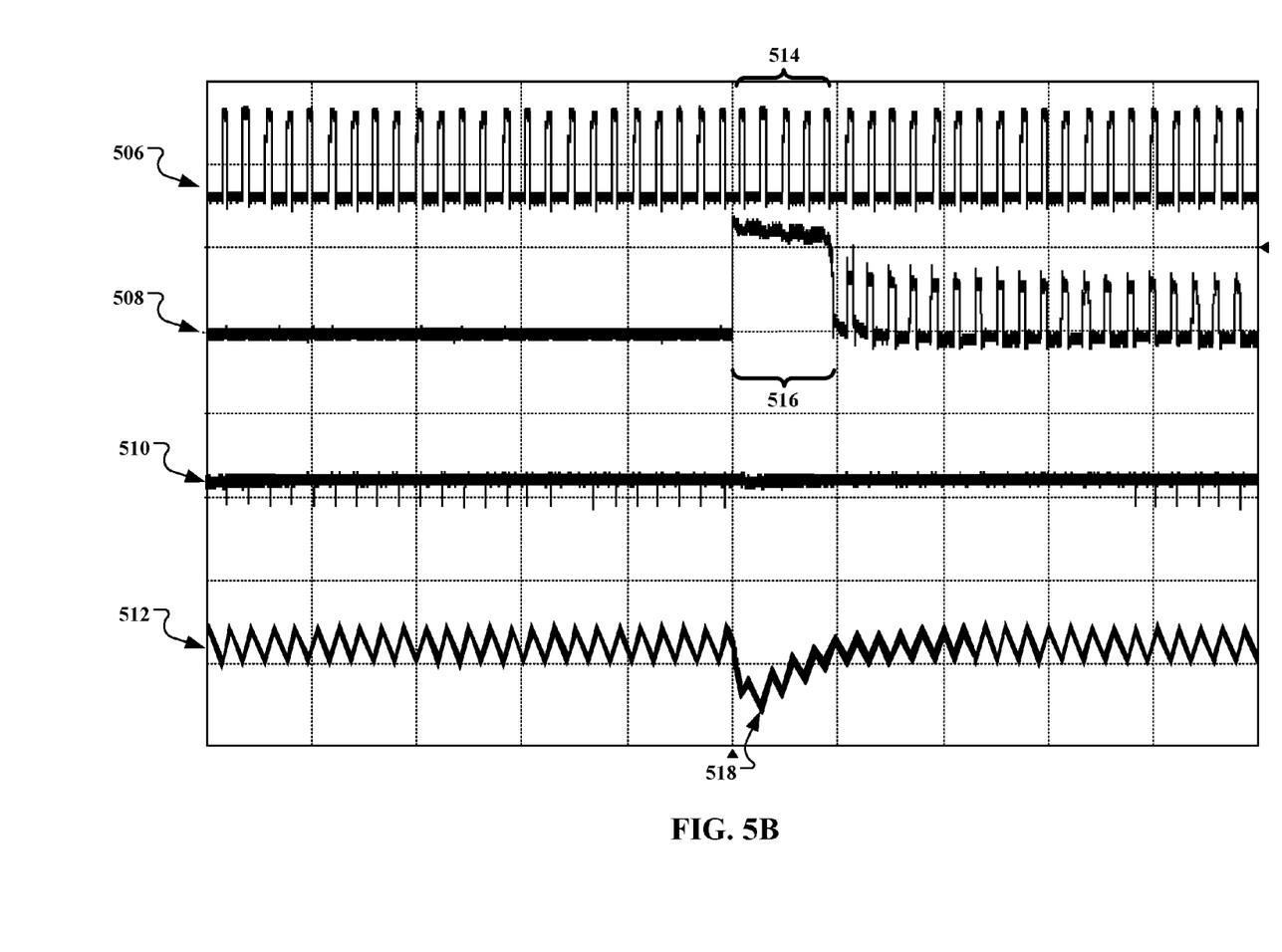
FIG. 5B shows an example of a graph illustrating the performance of each phase of a three-phase spindle motor with the current surge shown in FIG. 3B removed.

FIG. 5B shows an example of a graph illustrating the performance of each phase of a three-phase spindle motor with the current surge shown in FIG. 3B removed. Similar to FIG. 3B, the drive signal for phase A as shown in FIG. 5B is represented by reference numeral 506, the drive signal for phase B is represented by reference numeral 508, and the drive signal for phase C is represented by reference numeral 510. With the spindle motor 104 driven using a new duty cycle 514, current surge is effectively suppressed in the supply current 512 during the recirculation period 516, as indicated by the current level drop 518. After the recirculation period, the supply current rises again to allow peak current to be drawn so as to maximize the motor speed of the spindle motor 104.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A method comprising:
   identifying a present duty cycle associated with a phase winding of a motor;
   identifying a current limit associated with the motor;
   determining a new duty cycle based on the current limit, wherein the new duty cycle permits supply current to be drawn without exceeding the current limit; and
   adjusting the present duty cycle of the phase winding using the new duty cycle, including controlling commutation associated with a plurality of phase windings of the motor to generate a predetermined commutation angle at one or more transitional periods that comprise a current recirculation period, and the present duty cycle is adjusted before the one or more transitional periods.

2. The method of claim 1, where identifying the present duty cycle includes identifying a maximum duty cycle that achieves a maximum motor speed of the motor, the method further comprising:
   driving the motor based on the maximum duty cycle.

3. The method of claim 2, where determining the new duty cycle includes:
   determining the new duty cycle that achieves the maximum motor speed and compensates for current surge triggered during phase switching of the phase winding.

4. The method of claim 3, where adjusting the present duty cycle includes adjusting the present duty cycle during phase switching of the phase winding.

5. The method of claim 3, where determining the new duty cycle includes identifying a new duty cycle that is smaller than the present duty cycle.

6. The method of claim 5, where determining the new duty cycle includes determining a new duty cycle that meets the current limit and maximum motor speed.

7. The method of claim 5, where adjusting the present duty cycle includes reducing the present duty cycle based on the new duty cycle.

8. The method of claim 7, where reducing the present duty cycle includes adjusting an output of a digital-to-analog converter configured to generate a current flowing through the motor to control the maximum motor speed of the motor.

9. A device comprising:
a motor; and
a motor control module configured to control a motor speed of the motor, the motor control module including a control module to:
identify a present duty cycle associated with a phase winding of the motor;
identify a current limit associated with the motor;
determine a new duty cycle based on the current limit; and
adjust the present duty cycle of the phase winding using the new duty cycle, where the motor control module is configured to determine a current recirculation period at which drive voltages among respective windings of the motor are commutated, where the duty cycle is adjusted during the current recirculation period.

10. The device of claim 9, where the present duty cycle allows a maximum motor speed of the motor to be achieved.

11. The device of claim 10, where the new duty cycle yields the maximum motor speed and compensates for current surge triggered during phase switching of the phase winding.

12. The device of claim 11, where the present duty cycle is adjusted during phase switching of the phase winding.

13. The device of claim 11, where the new duty cycle is smaller than the present duty cycle.

14. The device of claim 13, where the new duty cycle meets the current limit and yields the maximum motor speed.

15. The device of claim 13, where the present duty cycle is adjusted by reducing the present duty cycle based on the new duty cycle.

16. The device of claim 15, where the present duty cycle is adjusted by adjusting an output of a digital-to-analog converter configured to generate a current flowing through the motor to control the maximum motor speed of the motor.

17. The method of claim 1, comprising determining the current recirculation period.

18. A system comprising:
a motor having a plurality of phase windings and operating at a first duty cycle;
a digital-to-analog converter to control the first duty cycle for controlling a motor speed of the motor; and
a controller to:
determine a current limit associated with limiting a current flowing through the plurality of phase windings;
identify a second duty cycle based on the current limit; and
control the digital-to-analog converter to adjust the first duty cycle of the motor based on the second duty cycle,
where the controller controls commutation associated with the plurality of phase windings to generate a predetermined commutation angle at one or more transitional periods that comprise a current recirculation period, and adjusts the first duty cycle to the second duty cycle before the one or more transitional periods.

19. The system of claim 18, where the digital-to-analog converter controls the motor speed of the motor by reducing the first duty cycle to the second duty cycle.

20. The system of claim 18, where the controller determines the current recirculation period.

* * * * *